United States Patent

[11] 3,603,399

[72] Inventor Marion G. Reed
Hacienda Heights, Calif.
[21] Appl. No. 875,026
[22] Filed Nov. 10, 1969
[45] Patented Sept. 7, 1971
[73] Assignee Chevron Research Company
San Francisco, Calif.

[54] FORMATION PERMEABILITY MAINTENANCE WITH HYDROXY-ALUMINUM SOLUTIONS
5 Claims, 1 Drawing Fig.

[52] U.S. Cl. .................................... 166/305 R, 166/292
[51] Int. Cl. .................................... E21b 43/25
[50] Field of Search .................................... 166/275, 292–294, 305 R, 312; 252/8.55 R; 61/36 R; 210/42

[56] References Cited
UNITED STATES PATENTS

| | | | |
|---|---|---|---|
| 2,939,839 | 6/1960 | Brukner | 252/8.55 R |
| 3,013,607 | 12/1961 | Bond et al. | 166/292 X |
| 3,044,959 | 7/1962 | Martin | 252/8.55 R |
| 3,131,759 | 5/1964 | Slusser et al. | 166/305 R |
| 3,382,924 | 5/1968 | Veley et al. | 166/305 R |
| 3,406,115 | 10/1968 | White | 252/8.55 R |

OTHER REFERENCES

Davis; C. W., The Swelling Of Bentonite And Its Control. In ND & Eng. Chem., 19(12), Dec. 1927, pp. 1350– 1352. (Copy in 166– 294).

Primary Examiner—Ian A. Calvert
Attorneys—A. L. Snow, F. E. Johnston, R. L. Freeland, Jr. and E. J. Keeling

ABSTRACT: The disclosure provides a method of treating a water-sensitive formation penetrated by a well by contacting the formation with a hydroxy-aluminum solution having a ratio of the hydroxyl groups to the aluminum atoms in the range of from 1.5 to 2.7.

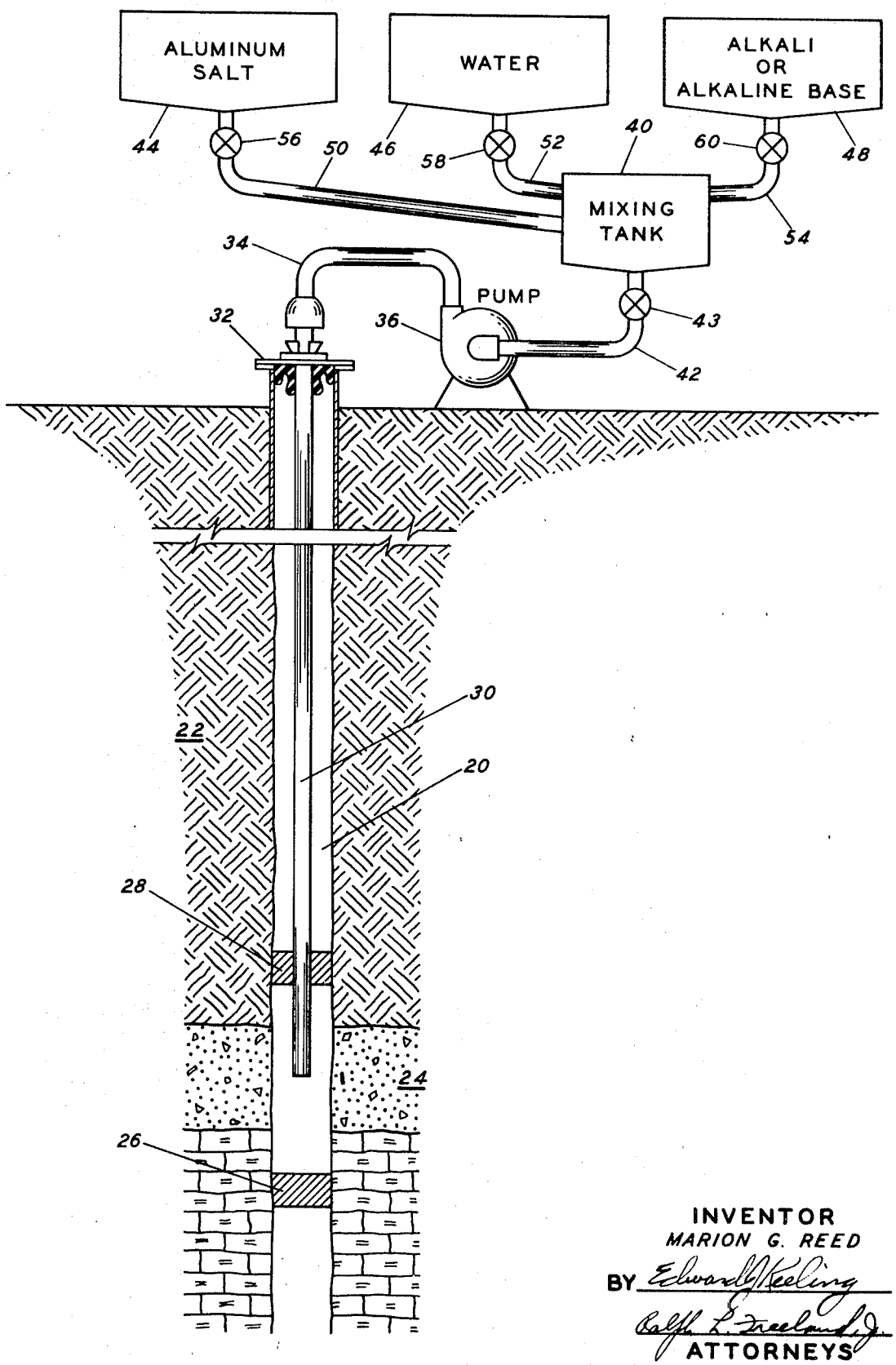

3,603,399

FORMATION PERMEABILITY MAINTENANCE WITH HYDROXY-ALUMINUM SOLUTIONS

BACKGROUND OF THE INVENTION

This invention relates to a method of treating a water-sensitive formation penetrated by a well and, more particularly, the invention provides for injecting down a well and contacting with a water-sensitive formation a hydroxy-aluminum solution having a ratio of hydroxyl groups to aluminum atoms in the range of from 1.5 to 2.7.

In petroleum-producing operations, wells which penetrate oil-bearing formations are used to provide connection with the formation and the surface. These wells may be producing wells through which oil is produced, or injection wells into which water or other substances is injected to promote oil recovery from adjacent wells which also penetrate the producing formation. In both types of wells the formations adjacent to the wells are often contacted with foreign water during producing operations. Nearly all of these formations contain clay materials of different types and in various amounts. The equilibrium of these clay materials is often drastically disturbed on contact with water. Serious permeability losses can occur should the clay materials obstruct flow by either expanding to fill pore spaces or by dispersing and lodging in pore constrictions. Oftentimes structural expansion occurs when additional water is absorbed between clay layers. If large amounts of expanding type or swelling clays are present, a very significant fraction of the flow channels may be closed by the increased clay volume.

Clay particle migration is believed to be even a more serious damage mechanism than clay swelling. This is particularly true because substantial amounts of damage can be done by this mechanism when there is only a small amount of clay present in the formation. Clay particles dispersed in the flow channels are carried downstream until they lodge in pore constrictions. Permeability of the formation is reduced by means of these particles forming miniature filter cakes and filling these pore constrictions.

A specific force acting on the expanding or swelling clays to expand the structure is caused by the affinity of the exchangeable interlayer cations and interlayer surfaces for water. Heretofore, organic cations such as amines have been used to decrease this tendency of the clays to expand on contact with fresh water by replacing the exchangeable cations with cations less inclined to attract water to interlayer sites. However, the organic cations have been not entirely satisfactory because they are expensive and they are also displaced from the clay surfaces after time by reservoir brines.

Another force which causes both structural expansion of clays and particle dispersion of clays results from the inherent negative charge on almost all clay minerals. This charge is neutralized by absorption of cations on clay surfaces. Since the cations tend to dissociate, a positive ion swarm is established in the solution near the surface of the particle and a negative charge exists within the particle. This is normally referred to as an electric double layer. Particles with such double layers repel each other and they tend to disperse. Since the strength of repulsion is directly related to the dissociative tendency of the absorbed cations, more firmly attached cations tend to decrease the double layer thickness and thus to reduce the tendency of the particles to disperse. This nullifies the inherent negative charge on the clay surface. Heretofore, multivalent cations such as calcium have been used to treat water to sensitive formations. However, these cations are readily exchangeable from clay surfaces by reservoir brines and thus give only temporary protection under most conditions.

In summary, therefore, there is need for a method of treating such water-sensitive formations which provides positive and long lasting protection for such formations from the adverse effects of the above-discussed swelling and migrating clays.

BRIEF DESCRIPTION OF THE INVENTION

The present invention provides for treating formations containing water-sensitive clays by contacting the formations with a hydroxy-aluminum solution having a ratio of the hydroxyl groups to aluminum atoms in the range of from 1.5 to 2.7. In a typical application, a water-sensitive formation penetrated by a well is treated with a solution formed by adding to water a quantity of aluminum salts selected from the group consisting of aluminum chloride, aluminum bromide, aluminum iodide, aluminum nitrate, aluminum sulfate, and aluminum acetate, in an amount of between 0.01 and 24.0 pounds of aluminum per barrel of water to form an aluminum salt solution and then adding to such water an alkali or alkaline base in an amount of between 0.95 and 1.7 pounds of hydroxyl ion for each pound of aluminum to form a hydroxy-aluminum solution. The aforesaid hydroxy-aluminum solution is injected down the well and into the formation to stabilize the water-sensitive clays in the formation. In many instances it is desirable to follow the injection of the hydroxy-aluminum solution with an injection of fresh water. The well in some cases is shut-in to permit polymerization of the hydroxy-aluminum solution in the formation to stabilize the water-sensitive clays in the formation.

OBJECTS OF THE INVENTION

It is a particular object of the present invention to provide a method of stabilizing a formation containing water-sensitive clays by contacting the formation with a hydroxy-aluminum solution. Further objects and advantages of the present invention will become apparent from reading the following detailed description in view of the accompanying drawing which is made a part of this specification.

BRIEF DESCRIPTION OF THE DRAWING

The drawing illustrates in schematic form an earth formation penetrated by a well which well has connected thereto apparatus for performing the method of the present invention.

DESCRIPTION OF THE PREFERRED EMBODIMENT OF THE INVENTION

The invention finds its utility in a well environment to stabilize clays in formations of interest penetrated by the well. Referring specifically to the drawing, a well 20 penetrating an earth formation 22 is shown. The well 20 penetrates a producing formation 24 which, for example, may contain water-sensitive clays which react when contacted by water to swell or to migrate and to thus drastically reduce permeability of the formation. Depending on the configuration of the well, it may be provided with suitable packers 26 and 28 above and below the producing formation 24. A tubing string 30 provides fluid communication from the surface through wellhead 32 to the producing formation 24. Suitable surface tubing 34 connects the tubing string 30 with the discharge of a suitable pump 36.

A mixing tank 40 is connected to the intake of the pump 36 by a suitable conduit 42. A valve 43 controls flow from the mixing tank 40 through conduit 42 to the pump 36. The mixing tank 40 receives the materials for preparing the hydroxy-aluminum solution. In accordance with the present invention therefore means 44 defining a source of aluminum salt, means 46 defining a source of water and means 48 defining a source of alkali or alkaline base are connected by suitable conduits to the mixing tank. Thus suitable tubing 50, 52 and 54 having adjustable valves 56, 58 and 60, respectively, provides for the flow of the components from their respective sources to mixing tank 40 for the formation therein of the hydroxy-aluminum solution.

It has been found that clay swelling and clay migration caused by water contact in formations penetrated by a well can be substantially eliminated by contacting such formations with a hydroxy-aluminum solution prepared in accordance with the present invention. The hydroxy-aluminum solution should have a ratio of the hydroxyl groups to the aluminum atoms in the range of from 1.5 to 2.7. In a typical application, the water-sensitive formation is treated with a solution formed by mixing water first with a quantity of aluminum salts selected from the group consisting of aluminum chloride, aluminum bromide, aluminum iodide, aluminum nitrate, aluminum sulfate and aluminum acetate. The selected salt is added in an amount of between 0.01 and 24.0 pounds of aluminum per barrel of water to form an aluminum solution. To this aluminum solution is added an alkali or an alkaline base in an amount of between 0.95 and 1.7 pounds of hydroxyl ion for each pound of aluminum to form a hydroxy-aluminum solution. The aforesaid hydroxy-aluminum solution is formed in the manner hereinafter described in a suitable mixing tank and is then injected down the well and into the formation to stabilize water-sensitive clays in the formation. In many instances, it is desirable to follow the injection of the hydroxy-aluminum solution with an injection of fresh water into the well and into the formation. The well is then shut-in to permit polymerization of the hydroxy-aluminum solution in the formation to stabilize the water-sensitive clays contained in the formation.

The volume of the hydroxy-aluminum solution that should be injected into the formation, of course, depends on the vertical interval of the formation and the distance out into the formation away from the well that it is desired to treat. Treatment volume depends on factors such as porosity, surface area and cation exchange capacity. Normally, one volume of the preferred hydroxy-aluminum solution will protect one volume of formation pore space. In certain formations, less hydroxy-aluminum solution will protect considerably more pore space. For example, in certain sandstones, one volume of the preferred hydroxy-aluminum solution will protect three volumes of pore space. Since the characteristics of formations vary, different treatment volumes will be required depending on the local formation conditions. Generally, however, it is preferred to inject one volume of hydroxy-aluminum solution per volume of formation to be treated.

A particularly desirable method of treating a formation containing water-sensitive clays includes forming a treatment solution by first adding to water a quantity of an aluminum salt selected from the group consisting of chloride, bromide, iodide, nitrate, sulfate and acetate in an amount of between 0.01 and 24.0 pounds of aluminum per barrel. The aluminum salt should be completely dissolved in water, after which an alkali or alkaline earth base in an amount of about 0.95 and 1.07 pounds of OH for each pound of aluminum is added to the water. This material is slowly added to the solution while stirring vigorously. Addition of the base should be made at the point of highest shear in the mixing system. The above materials are preferably added to the water at a rate so that all the materials will be added in from 30 minutes to 1 hour. The addition of the alkali or AEB will cause precipitation in the system and thus clouding of the solution. However, after a period of time the precipitate will dissolve and a clear solution will result. The time it takes for the solution to clarify depends on the temperature, aluminum concentration, stirring vigor and rate of addition of caustic. The latter two factors affect particle size of the precipitate and thus the rate at which it dissolved. At about 75° F., 5 to 8 hours are required for the solution to clear when prepared as above in the laboratory using a one-liter beaker and a magnetic stirrer. It is important that the solution be clear prior to it being injected into the formation. The clarified solution is injected down a well and into the formation. After the injection of such solution, fresh water in an amount at least one and not more that four times as much as the volume of the hydroxy-aluminum solution is injected into the formation. The well is shut-in for a time to permit polymerization of the solution in the formation to stabilize the clays therein. The well should be shut-in for approximately 1 to 3 days.

A particularly preferred and highly efficient procedure for use in field operations involves the use of aluminum chloride and sodium hydroxide in the preparation of the hydroxy-aluminum solution. The solution is prepared by partially neutralizing an aluminum chloride solution with sodium hydroxide. The solution is prepared in the field by first filling a large vessel with sufficient water to treat the desired volume of formation rock. As indicated above, this volume is preferably in a ratio of one volume of solution to one pore volume of the rock. The vessel is provided with a means for vigorously stirring or circulating the solution within the vessel. Aluminum chloride hexahydrate ($AlCl_3.6H_2O$) in an amount of 8.7 pounds per barrel of water is slowly added to the water. After the aluminum chloride solution is prepared, sodium hydroxide in an amount of 2.9 pounds per barrel is slowly added to the aluminum chloride solution. The sodium hydroxide is added to the solution at the point which would provide the best mixing and at a rate such that all will be added in from 30 minutes to 1 hour. The mixture will cloud during the addition of the sodium hydroxide due to the formation of a precipitate. However, the solution will clarify in time depending on the temperature, the aluminum concentration, the stirring vigor, and the rate of addition of caustic. The clear hydroxy-aluminum solution may be injected directly into producing and/or injection wells without pretreatment of the wells, except in the case of caustic wells. In this special case, the caustic must be purged from the well with brine before injecting the solution to prevent undesirable precipitation. The clear hydroxy-aluminum solution is injected into the formation and contacted with the water-sensitive clays found therein. At the termination of this injection, the formation is overflushed with 1 to 4 times, and preferably 3 times as much fresh water as the hydroxy-aluminum solution used. The well is then shut-in for from one to three days to allow for aging of the hydroxy-aluminum solution. The shut-in period is not necessary in fresh water injection wells. The shut-in period allows the hydroxy-aluminum solution time to polymerize to a very stable and exchange-resistant material on silicate surfaces. If brine flow is resumed too soon, aluminum may be displaced from the clay surfaces an incomplete conversion will result. After the aging, the well may be put back on production or injection.

Demonstrations have been conducted in the laboratory to illustrate the advantages of the present invention. Variables used in the laboratory demonstrations were concentration of the hydroxy-aluminum solution, the aging time of the formation after treatment and the aging medium in the formation during the aging time. Berea sandstone was used in the demonstrations because after sodium saturation this sandstone is very sensitive to fresh water and this sandstone's composition and physical properties, particularly permeability, are quite uniform. In addition, it has been found that clay particle dispersion and migration are the principal damage mechanisms in Berea sandstone.

In the demonstrations, one inch diameter cores were cut from a large piece of Berea sandstone. The cores were cleaned with toluene which was then evaporated in an oven at 70° C. The dry cores were vacuum-saturated with 0.3N $CaCl_2$ and then flooded with deionized water in a Hassler cell. The permeability to water was then measured and used as the original rock permeability. Some of the cores, as indicated below in Table I, were then flooded with 100 ml. of 0.1M $AlCl_3$ (OH/Al = 0), others with 100 ml. of 0.1M $Al(OH)_2Cl$(OH/Al = 2.0), and still others with 100 ml. of 0.1M $Al(OH)_{2.4}Cl_{0.6}$(OH/Al = 2.4). Cores from each of these groupy were allowed to age for different periods of time, both with and without first washing out the excess aluminum salt. After the aging period, each core was flooded with a liter of 0.1N NaCl and then with deionized water. This was a severe test for water-sensitivity and also provided information about the exchangeability of aluminum and OH-Al ions on clay surfaces. Some of the cores were leached with additional NaCl (9 liters) to determine whether longer exposure causes exchange of the aluminum and, in turn, greater permeability losses with deionized water. The data are shown in Table I.

TABLE I.—WATER SENSITIVITY OF BEREA SANDSTONE AFTER HYDROXY-ALUMINUM TREATMENTS WITH DIFFERENT OH/Al RATIOS, AGING PERIODS AND AGING MEDIA

| OH/Al | Aging period | Aging medium | Permeability to deionized water after NaCl floods (percent of original) | |
|---|---|---|---|---|
| | | | After 1 liter NaCl | After 10 liters NaCl |
| 0.0 | 20 min | H$_2$O | 19 | |
| | 20 min | AlCl$_3$ | 63 | |
| | 2 days | H$_2$O | 52 | |
| | 7 days | H$_2$O | 84 | 17 |
| 2.0 | 20 min | H$_2$O | 96 | 90 |
| | 20 min | OH-Al | 62 | |
| | 2 days | H$_2$O | 91 | 91 |
| | 2 days | OH-Al | 81 | 81 |
| | 7 days | H$_2$O | 99 | 99 |
| 2.4 | 20 min | H$_2$O | 95 | 91 |
| | 20 min | OH-Al | 53 | |
| | 2 days | H$_2$O | 96 | 96 |
| | 2 days | OH-Al | 93 | 93 |
| | 7 days | H$_2$O | 100 | 100 |

By comparing water-sensitivities for different OH/Al ratios as shown in Table I, it is apparent that AlCl$_3$ alone (without prior conversion to hydroxy-aluminum with a base) does not adequately provide lasting protection for the rock against fresh water permeability damage. Increased aging time was beneficial. However, even after 7 days, 87 percent of the permeability was lost when the core was flooded with deionized water after 10 liters of brine.

On the other hand, when the sandstone was treated with hydroxy-aluminum with an OH/Al ratio of either 2.0 or 2.4 and aged in fresh water there was little, if any, fresh water-sensitivity even 10 liters of brine. It is also apparent that it is beneficial to age the rock in fresh water rather than in the OH/Al solution. Therefore, after an OH/Al treatment, an overflush with fresh water is preferred. the data indicates, however, that the necessity for this overflush with fresh water is decreased if longer shut-in periods or OH/Al solutions with a higher OH/Al ratio are used.

As indicated above, it has been found that wells containing water-sensitive clays can be successfully treated by contacting the formation containing such clays with a hydroxy-aluminum solution having the formula Al(OH)$_n$X$_3{'}_n$ where n has a value of between 1.5 and 2.7 and X is any anion selected from the group consisting of chloride, bromide, iodide, nitrate, sulfate and acetate. Particularly desirable results have been achieved when the ratio of the hydroxyl groups to the Al atoms is maintained in the solution within the range of from 2.0 to 2.4.

From the above description it is evident that the present invention provides a method of stabilizing water-sensitive clays found in a formation penetrated by a well by contacting the formation and the water-sensitive clays contained therein with a hydroxy-aluminum solution. Although only specific embodiments of the present invention have been described in detail, the invention is not limited thereto but is meant to include all embodiments coming within the scope of the appended claims.

What is claimed is:

1. A method of stabilizing a formation penetrated by a well comprising injecting an aqueous hydroxy-aluminum solution down said well and into said formation, the ratio of the hydroxyl groups to Al atoms being in the range of from 1.5 to 2.7.

2. A method of stabilizing the permeability of a formation penetrated by a well comprising injecting down said well and into said formation a solution containing hydroxy-aluminum having the empirical formula Al(OH)$_n$X$_{31n}$ where $n$ has a value of between 1.5 and 2.7 and X is any anion in the group chloride, bromide, iodide, nitrate, sulfate and acetate.

3. A method of treating a water-sensitive formation penetrated by a well comprising adding to water a quantity of aluminum salts from the group chloride, bromide, iodide, nitrate, sulfate and acetate in an amount of between 0.01 and 24 pounds of Al per barrel, then adding to said water alkali or alkaline earth base in an amount of between 0.95 and 1.7 pounds of OH for each pound of Al, while vigorously stirring said water to form a hydroxy-aluminum solution, clarifying said solution, injecting said clear solution down said well and into said formation, then injecting fresh water in an amount at least 1 and not more than 4 times as much as the volume of such hydroxy-aluminum solution so injected, shutting said well to permit polymerization of said solution in said formation and reopening said well for operation therein.

4. The method of claim 3 further characterized in that the aluminum salt is aluminum chloride and that the base is sodium hydroxide.

5. The method of claim 3 further characterized in that one volume of said solution per volume of pore space of said formation is injected into said formation.

PO-1050
(5/69)

UNITED STATES PATENT OFFICE
CERTIFICATE OF CORRECTION

Patent No. 3,603,399      Dated September 7, 1971

Inventor(s) MARION G. REED

It is certified that error appears in the above-identified patent and that said Letters Patent are hereby corrected as shown below:

Col. 3, line 68, "that" should read --than--.

Col. 4, line 39, "an" should read --and--;

line 62, "o.1M" should read --0.1M--;

line 66, "groupy" should read --groups--.

Col. 5, line 31, after "even" and before "10", insert --after--;

line 34, "the" should read --The--;

line 41, "$X_3{}^1{}_n$" should read --$X_{3-n}$--.

Col. 6, line 21, "$X_{31n}$" should read --$X_{3-n}$--.

Signed and sealed this 30th day of May 1972.

(SEAL)
Attest:

EDWARD M.FLETCHER,JR.      ROBERT GOTTSCHALK
Attesting Officer              Commissioner of Patents